United States Patent
Lin et al.

(10) Patent No.: US 8,174,196 B2
(45) Date of Patent: May 8, 2012

(54) ALTERNATING CURRENT LIGHT EMITTING DIODE DEVICE

(75) Inventors: Ying-Chu Lin, Fongshan (TW); Hui-Ying Kuo, Jhonghe (TW)

(73) Assignee: Everlight Electronics Co., Ltd., New Taipei (TW)

( * ) Notice: Subject to any disclaimer, the term of this patent is extended or adjusted under 35 U.S.C. 154(b) by 0 days.

(21) Appl. No.: 11/626,850

(22) Filed: Jan. 25, 2007

(65) Prior Publication Data
US 2008/0169766 A1 Jul. 17, 2008

(30) Foreign Application Priority Data
Jan. 11, 2007 (TW) .............................. 96200572 U

(51) Int. Cl.
*H01J 7/44* (2006.01)
(52) U.S. Cl. .............................. 315/33; 315/32; 362/800
(58) Field of Classification Search ............... 315/200 R
See application file for complete search history.

(56) References Cited

U.S. PATENT DOCUMENTS

| | | | | |
|---|---|---|---|---|
| 3,280,389 A * | 10/1966 | Martin | ........................... | 257/688 |
| 4,950,956 A * | 8/1990 | Asamaki et al. | .......... | 315/111.21 |
| 5,017,833 A * | 5/1991 | Clarke et al. | ..................... | 315/51 |
| 5,966,052 A * | 10/1999 | Sakai | ............................... | 331/68 |
| 6,387,730 B2 * | 5/2002 | Guillot | ........................... | 438/107 |
| 7,165,863 B1 * | 1/2007 | Thomas et al. | ............... | 362/219 |
| 7,728,346 B2 | 6/2010 | Takikawa | | |
| 2002/0125830 A1 | 9/2002 | Okuda et al. | ................ | 315/169.3 |
| 2006/0256826 A1* | 11/2006 | Lin et al. | ..................... | 372/43.01 |
| 2007/0069663 A1* | 3/2007 | Burdalski et al. | .............. | 315/312 |

* cited by examiner

*Primary Examiner* — Douglas W Owens
*Assistant Examiner* — Jianzi Chen
(74) *Attorney, Agent, or Firm* — Han IP Law PLLC; Andy M. Han

(57) ABSTRACT

An alternating light diode device is provided and includes a substrate, a rectifier and a light emitting diode. The rectifier, a bridge rectifier with four diodes, includes a first alternating terminal and a second alternating terminal receiving an alternating signal and a first electrode and a second electrode outputting a rectified signal. The light emitting diode is electrically connected with the first electrode and the second electrode. Furthermore, the rectifier and the light emitting diode are mounted on the hexagonal star-shaped aluminum substrate wherein the rectifier is arranged around the substrate.

20 Claims, 5 Drawing Sheets

ALTERNATING CURRENT LIGHT EMITTING DIODE DEVICE

BACKGROUND

1. Field of Invention

The present invention relates to a light emitting diode, and more particularly to a light emitting diode driven by the alternating current.

2. Description of Related Art

Light emitting diodes have high reaction speeds, smaller volumes, lower power consumption, less heat radiation and extended lifetimes and the light emitting diodes have therefore gradually replaced conventional incandescent or halogen lamps. Applications for light emitting diodes, like the indication light for electronic apparatus, the back light source of the liquid crystal display (LCD) and the illuminator, are continually being extended as technology progresses.

However, the current inputted into the light emitting diode must be controlled precisely to maintain the radiation function. In addition, the light emitting diode is driven by a current such that it cannot be electrically connected with a low voltage source. The illumination is unstable when the current variation from the driving voltage is large. The light emitting diode is broken when the current exceeds the predetermined tolerant value.

The conventional light emitting diode is driven by a 3.5V direct current converted by a converter. Thus, the production cost is higher and the occupied volume is also large.

Refer to FIG. 1 and FIG. 2. FIG. 1 illustrates a circuit diagram of the conventional light emitting diode driven by the alternating current, and FIG. 2 illustrates an oscillogram of the sinusoidal signal detected from point A in FIG. 1. In this supply condition, the reverse bias damages the light emitting diode 700 or results in power-dissipation such that design flexibility and applications are limited. Take the bicycle lamp supplied by an alternating source for example, the light emitting diode cannot be directly driven by the generator.

As a result, there is a need for an alternating current light emitting diode without the converter to supply a stable direct current with sinusoidal signal.

SUMMARY

It is therefore an object of an embodiment in accordance with the present embodiment to provide an alternating current light emitting diode to provide a light emitting diode driven by an alternating source to solve the failure and power-dissipation problems of the conventional alternating light emitting diode caused by the reverse bias.

It is therefore another object of an embodiment in accordance with the present embodiment to provide an alternating current light emitting diode to reach the thermal division effect through a substrate made of aluminum with better conductivity and heat-dissipation.

An embodiment of an alternating current light emitting diode is provided. The alternating light emitting diode includes a substrate, a rectifier and a light emitting diode. The rectifier is a bridge rectifier and is mounted on the substrate wherein the bridge rectifier includes a first diode, a second diode, a third diode and a fourth diode connected with each other. The rectifier includes a first alternating terminal and a second alternating terminal to receive an alternating signal, and also includes a first electrode and a second electrode to output a rectified signal. The light emitting diode is mounted on the substrate and is electrically connected to the first electrode and the second electrode. The rectifier is arranged around the light emitting diode on the substrate.

In accordance with the embodiment of the alternating current light emitting diode, the light emitting diode is mounted in the center of the substrate, and the diodes of the rectifier are arranged on the substrate in a rhombus arrangement wherein the first electrode, the second electrode, the first alternating terminal and the second alternating terminal are respectively arranged at four corners of the rhombus arrangement. The substrate is a hexagonal substrate with six semicircular indentations respectively defined in each interior angle of the hexagonal substrate to form a star-shaped substrate. The substrate is made of aluminum with better conductivity and heat-dissipation whereby the heat generated by the light emitting diode is averagely conducted to the substrate to cool and the module working efficiency is raised through the conductivity of the aluminum substrate. Consequently, the thermal division effect is carried out.

As a result, the alternating current light emitting diode of the present invention has the following effects:

1. The alternating current light emitting diode of the present invention solves the failure and power-dissipation problems of the conventional alternating current light emitting diode caused by the reverse bias.

2. Through the aluminum substrate with better conductivity and heat-dissipation, the alternating current light emitting diode of the present invention obtains thermal division effect.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
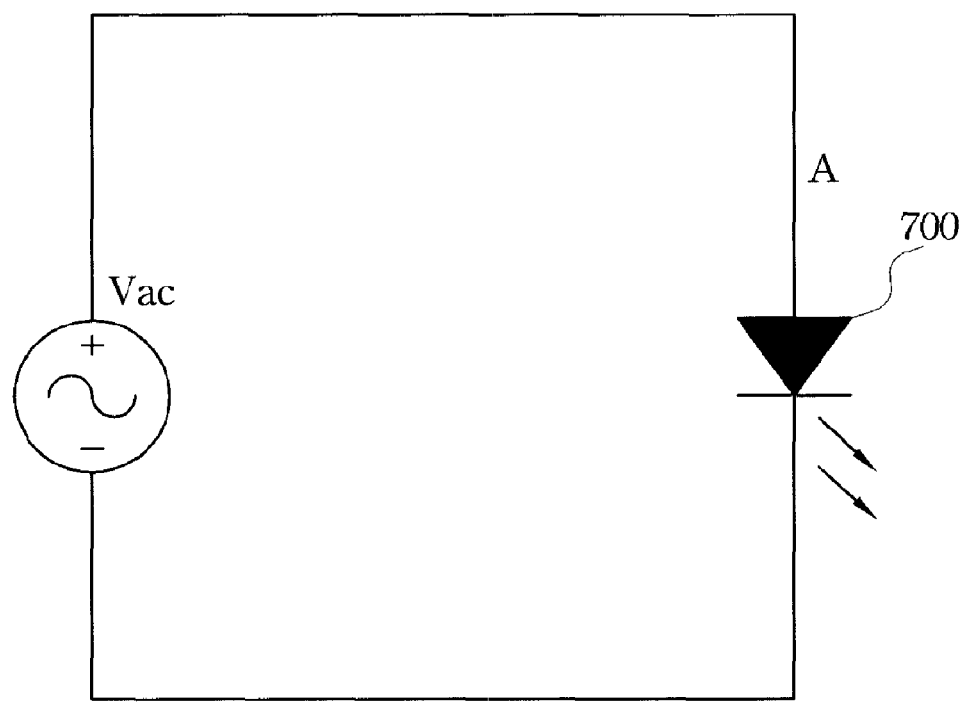
FIG. 1 is a circuit diagram of conventional light emitting diode driven by the alternating current source.
Figure 2:
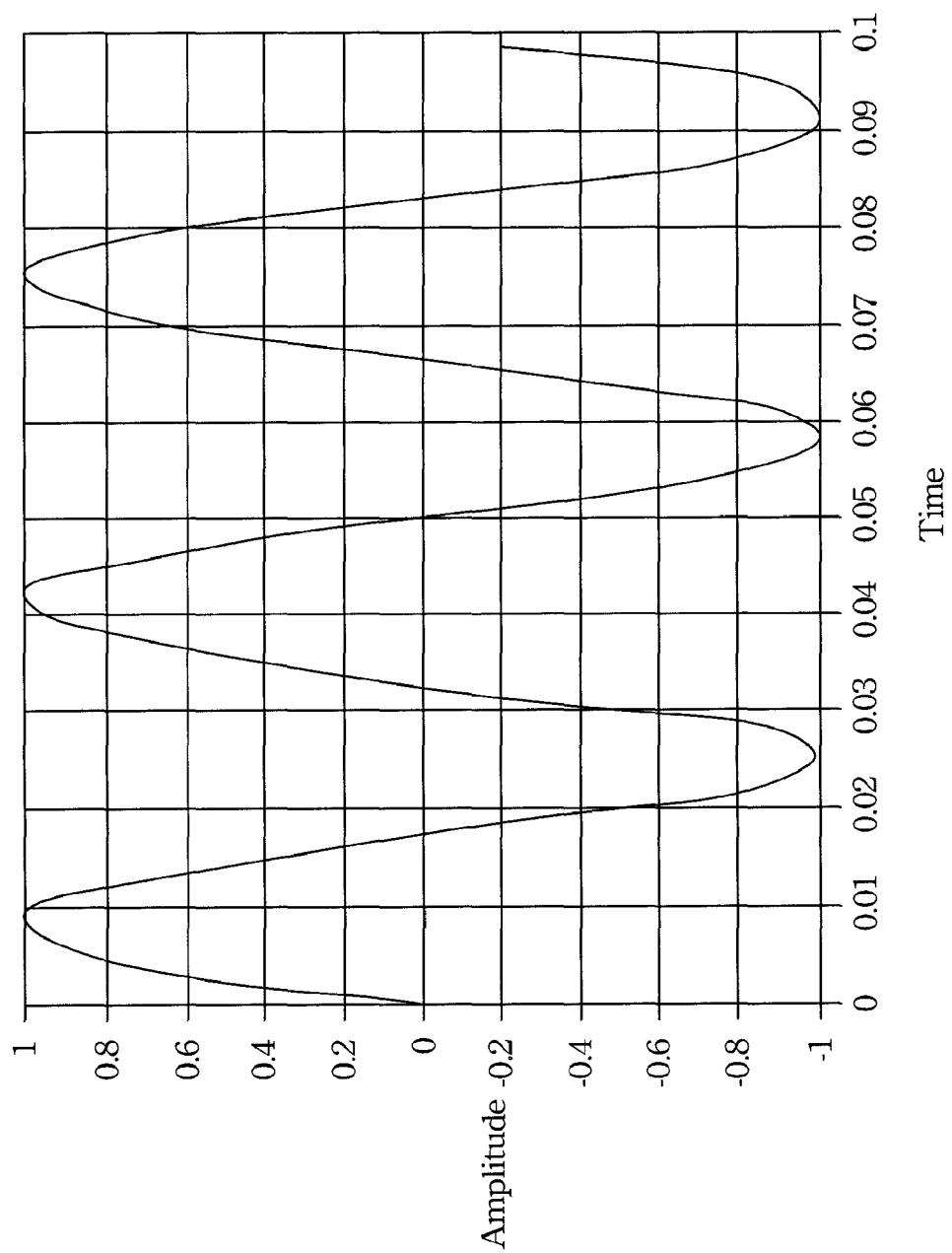
FIG. 2 is an oscillogram of the sinusoidal signal detected from point A in FIG. 1.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 3:
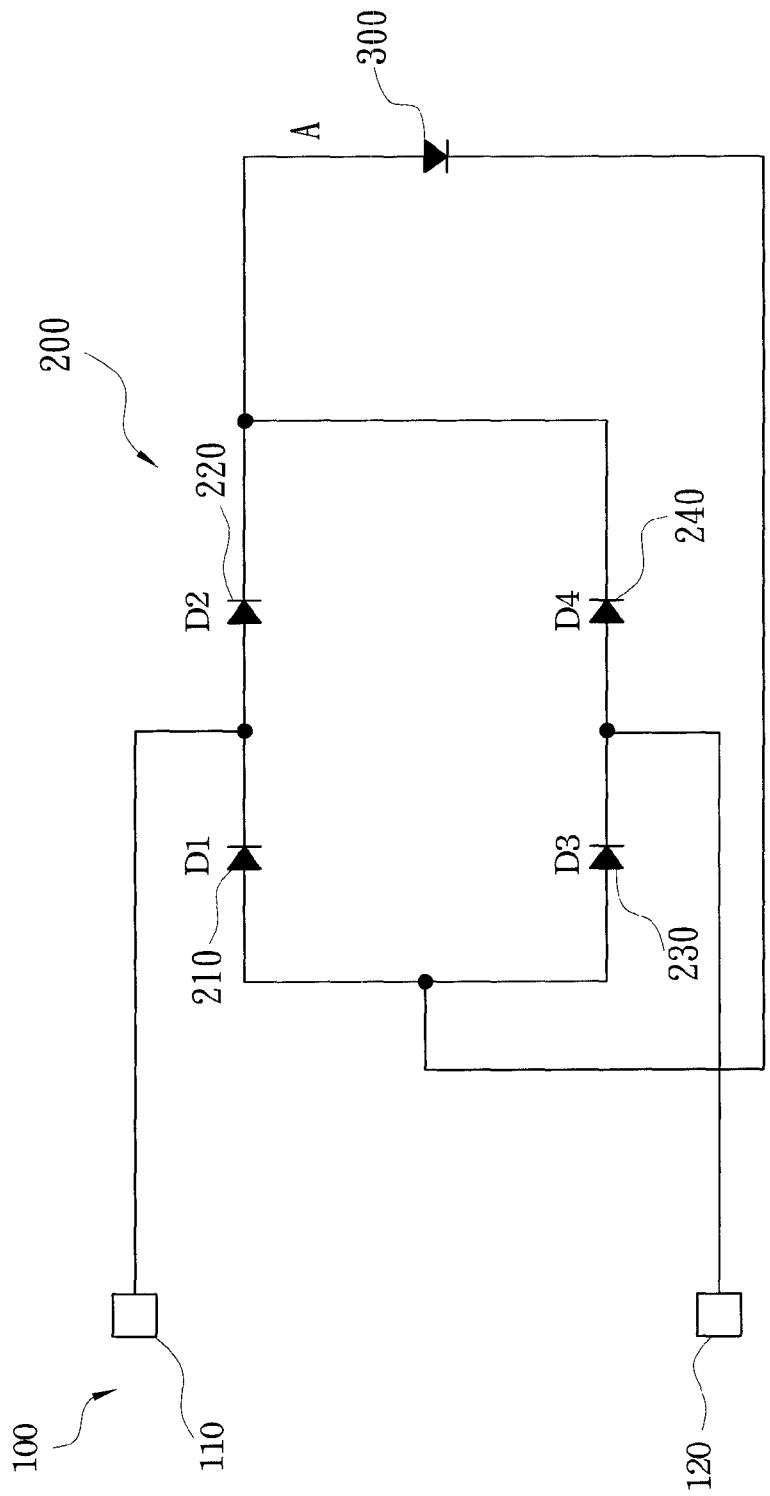
FIG. 3 is a circuit diagram of the alternating current light emitting diode device of the embodiment in accordance with the present invention.
Figure 4:
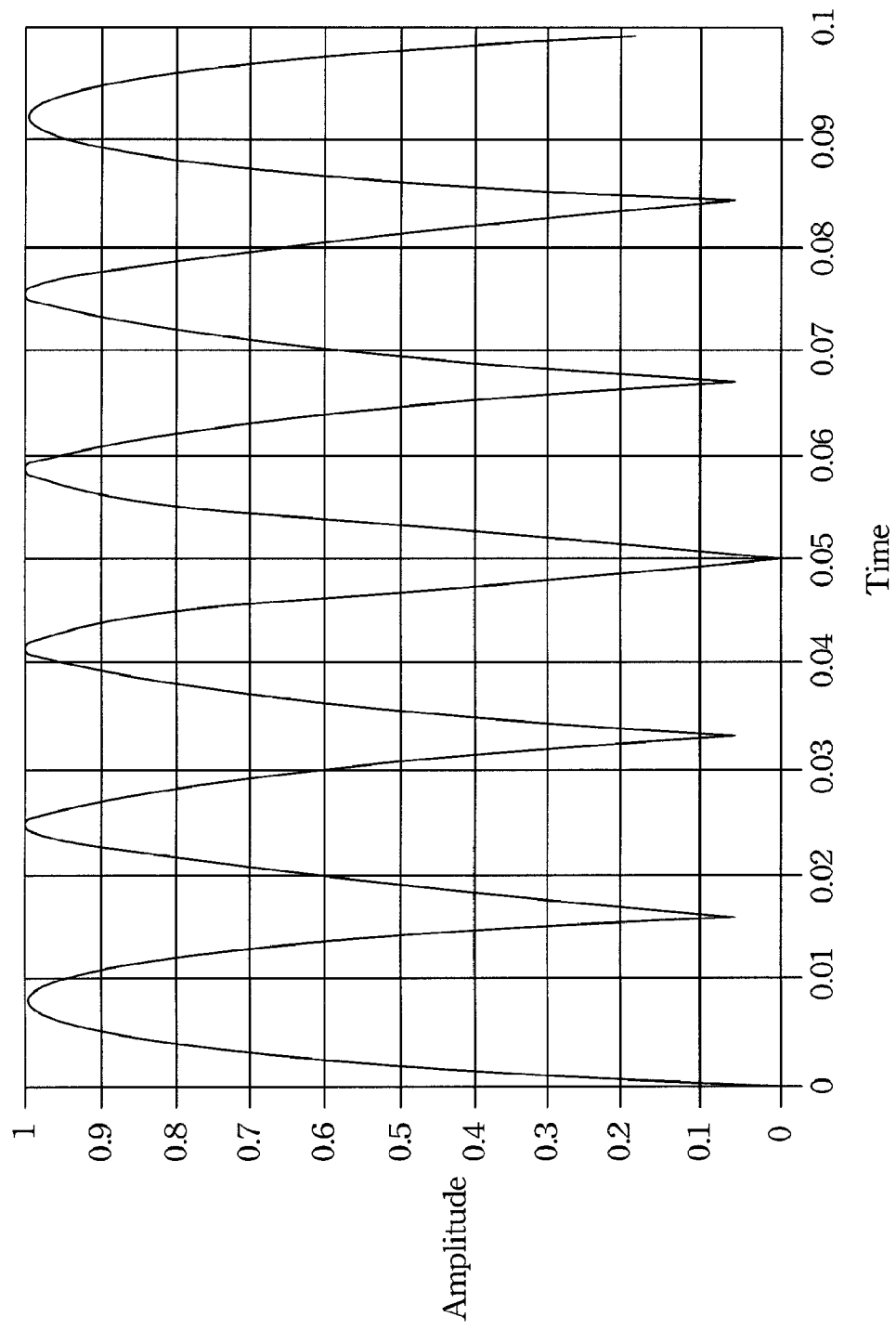
FIG. 4 is an oscillogram of the sinusoidal signal detected from point A in FIG. 3.

Refer to FIG. 3 and FIG. 4. FIG. 3 illustrates a circuit diagram of the alternating current light emitting diode of the embodiment in accordance with the present invention. FIG. 4 illustrates an oscillogram of the sinusoidal signal detected from point A in FIG. 3. The circuit of the alternating current light emitting diode device includes an alternating voltage source 100, a bridge rectifier 200 and a light emitting diode 300. The alternating voltage source 100 generates an alternating signal to the bridge rectifier 200 to produce a rectified signal to drive the light emitting diode 300.

The bridge rectifier 200 includes four diodes, a first diode 210, a second diode 220, a third diode 230 and a fourth diode 240. Because of the forward conducting feature of the diode, the second diode 220 and the third diode 230 is conducted under the positive sinusoidal, and the first diode 210 and the fourth diode 240 is conducted under the negative sinusoidal. Through the rectification function of the diode, the negative signal is rectified to the positive signal such that the sinusoidal signal detected from point A is a full-wave signal. Therefore, the light emitting diode 300 is driven without losing energy.

Figure 5:
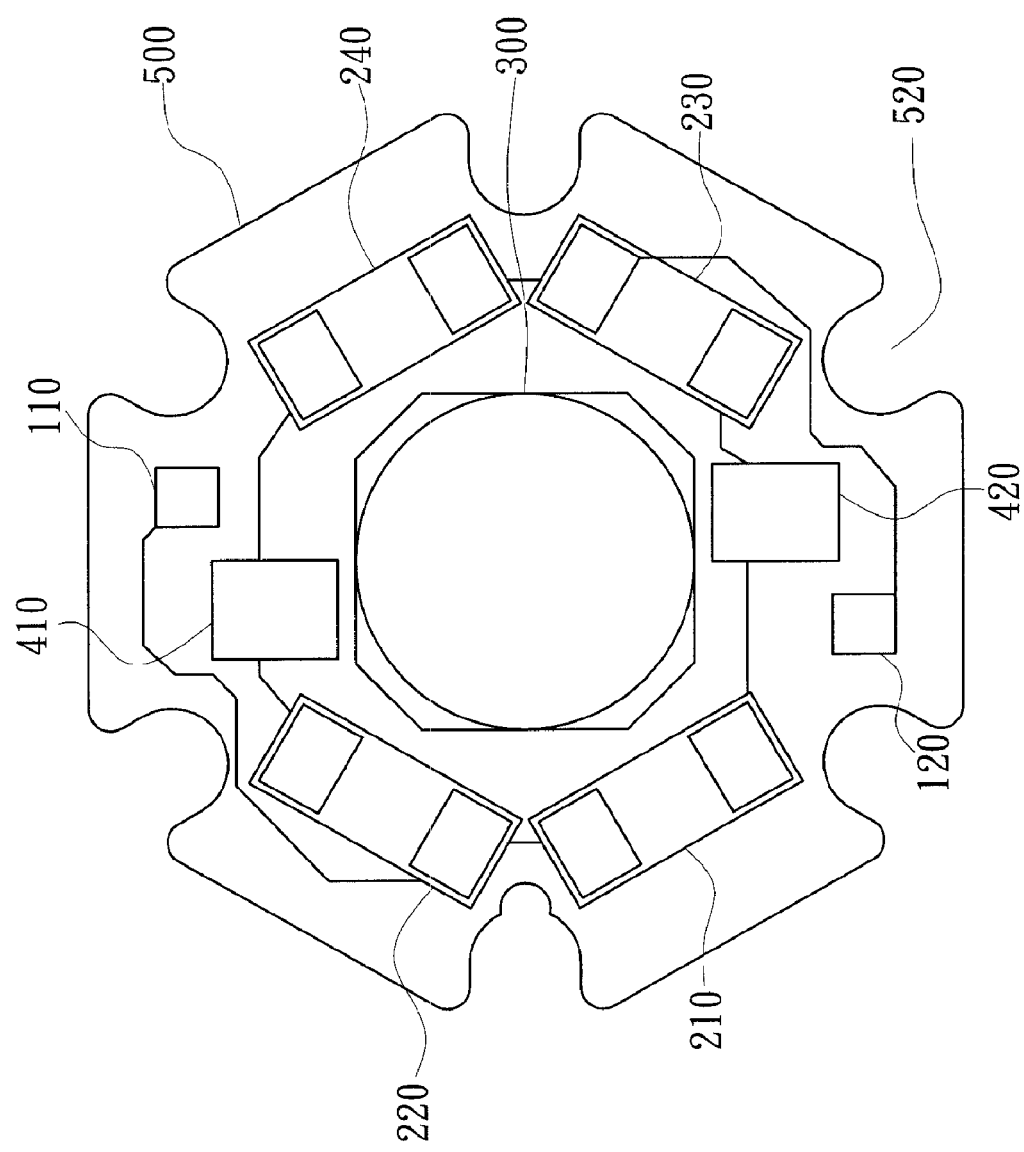
FIG. 5 is a schematic view of the alternating current light emitting diode device of the embodiment in accordance with the present invention.

Refer to FIG. 3 and FIG. 5. FIG. 5 illustrates a schematic view of the alternating current light emitting diode device of the embodiment in accordance with the present invention. The alternating current light emitting diode device includes a substrate 500, a rectifier 200 and a light emitting diode 300. The rectifier 200 is a bridge rectifier and includes a first alternating terminal 110, a second alternating terminal 120, a first electrode 410 and a second electrode 420. The bridge rectifier consists of a first diode 210, a second diode 220, a third diode 230 and a fourth diode 240 connected to each other. The light emitting diode 300 is electrically connected with the first electrode 410 and the second electrode 420.

The rectifier 200 and the light emitting diode 300 are mounted on the substrate 500 wherein the alternating signal is received by the first alternating terminal 110 and the second alternating terminal 120 of the rectifier 200, and the rectified signal is outputted from the first electrode 410 and the second electrode. Thus, the light emitting diode 300 is driven by the conduction between the second diode 220 and the third diode 230 when the alternating signal is positive; the light emitting diode 300 is driven by the conduction between the first diode 210 and the fourth diode 240 when the alternating signal is negative.

In this embodiment, the substrate 500 is a hexagonal substrate and there are six semicircular indentations 520 respectively defined in each interior angle to form a star-shaped appearance for location with other members in the following manufacturing.

The light emitting diode 300 is mounted in the center of the substrate 500, and the rectifier 200 is arranged around the light emitting diode 300 on the substrate 500. The first diode 210, the second diode 220, the third diode 230 and the fourth diode 240 are arranged in a rhombus arrangement wherein the first electrode 410, the second electrode 420, the first alternating terminal 110 and the second alternating terminal 120 are respectively arranged at four corners of the rhombus arrangement. In addition, the substrate 500 in this embodiment is made of aluminum with better conductivity and heat-dissipation whereby the heat generated by the light emitting diode 300 is uniformly conducted and dissipated through the substrate 500 to cool. The module working efficiency is raised through the conductivity of the aluminum substrate. Consequently, the thermal division effect is carried out.

As embodied and broadly described herein, the alternating current light emitting diode of the embodiment has the following effects:

1. The alternating current light emitting diode of the present invention solves the failure and power-dissipation problems of the conventional alternating current light emitting diode caused by the reverse bias.

2. Through the aluminum substrate with better conductivity and heat-dissipation, the alternating light emitting diode of the present invention obtains thermal division effect.

Although the present invention has been described in considerable detail with reference to certain preferred embodiments thereof, other embodiments are possible. Therefore, their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An alternating current light emitting diode (LED) device, comprising:
   a polygonal metal thermal conductive substrate having a plurality of indentations each respectively defined in a respective one of a plurality of corners of the polygonal metal substrate;
   a rectifier, which is a bridge rectifier with a first diode, a second diode, a third diode and a fourth diode, mounted on the metal thermal conductive substrate and comprising a first alternating terminal and a second alternating terminal to receive an alternating signal, and a first electrode and a second electrode to output a rectified signal; and
   a light emitting diode package mounted on the metal thermal conductive substrate and electrically connected to the first electrode and the second electrode;
   wherein the light emitting diode package is surrounded by the four diodes of the rectifier and the light emitting diode package and the rectifier are disposed on the same side of the metal thermal conductive substrate.

2. The alternating current light emitting diode device of claim 1, wherein the metal thermal conductive substrate has a center, and the light emitting diode package is mounted in the center of the metal thermal conductive substrate.

3. The alternating current light emitting diode device of claim 1, wherein the diodes of the rectifier are arranged on the metal thermal conductive substrate in a rhombus arrangement.

4. The alternating current light emitting diode device of claim 3, wherein the rhombus arrangement has four corners, and the first electrode, the second electrode, the first alternating terminal and the second alternating terminal are respectively arranged at the corners of the rhombus arrangement.

5. The alternating current light emitting diode device of claim 1, wherein the metal thermal conductive substrate is made of aluminum.

6. The alternating current light emitting diode device of claim 5, wherein the polygonal metal thermal conductive substrate is a hexagonal metal thermal conductive substrate.

7. The alternating current light emitting diode device of claim 6, wherein each of the indentations is a semicircle, and wherein the first diode, the second diode, the third diode, and the fourth diode of the bridge rectifier are arranged in a rhombus arrangement.

8. The alternating current light emitting diode device of claim 7, wherein the first electrode, the second electrode, the first alternating terminal, and the second alternating terminal are respectively arranged at four corners of the rhombus arrangement.

9. The alternating current light emitting diode device of claim 7, wherein the first electrode and one of the first and second alternating terminals are arranged at a first corner of four corners of the rhombus arrangement, and wherein the second electrode and the other one of the first and second alternating terminals are arranged at a second corner of the four corners of the rhombus arrangement.

10. The alternating current light emitting diode device of claim 1, wherein the four diodes of the rectifier are arranged symmetrically relative to and around the light emitting diode package on the same side of the metal thermal conductive substrate.

11. The alternating current light emitting diode device of claim 1, wherein the four diodes of the rectifier are respectively arranged on four sides of a rhombus.

12. An alternating current light emitting diode (LED) device, comprising:
   a thermally conductive substrate having a generally hexagonal shaped perimeter that defines a plurality of corners and a plurality of indentations, each one of the plurality of indentations defined in a respective one of the plurality of corners;
   a bridge rectifier with a first diode, a second diode, a third diode and a fourth diode, mounted on a surface of the thermally conductive substrate and comprising a first alternating terminal and a second alternating terminal to receive an alternating signal, and a first electrode and a second electrode to output a rectified signal; and
   a light emitting diode package electrically connected to the first electrode and the second electrode and mounted to a first surface of the thermally conductive substrate with the first, the second, the third, and the fourth diodes of the bridge rectifier being arranged as a rhombus arrangement around the light emitting diode package on the first surface.

13. The alternating current light emitting diode device of claim 12, wherein the light emitting diode package is mounted at a center of the generally hexagonal shaped perimeter of the thermally conductive substrate.

14. The alternating current light emitting diode device of claim 12, wherein the diodes of the bridge rectifier are arranged on the thermally conductive substrate in a rhombus arrangement.

15. The alternating current light emitting diode device of claim 14, wherein the rhombus arrangement has four corners, and the first electrode, the second electrode, the first alternating terminal and the second alternating terminal are respectively arranged at the respective corners of the rhombus arrangement.

16. The alternating current light emitting diode device of claim 12, wherein the thermally conductive substrate is made of aluminum.

17. The alternating current light emitting diode device of claim 12, wherein each of the indentations is a semicircle.

18. The alternating current light emitting diode device of claim 12, wherein the multiple indentations are generally semicircular.

19. The alternating current light emitting diode device of claim 12, wherein the first electrode, the second electrode, the first alternating terminal, and the second alternating terminal are respectively arranged at four corners of the rhombus arrangement.

20. The alternating current light emitting diode device of claim 12, wherein the first electrode and one of the first and second alternating terminals are arranged at a first corner of four corners of the rhombus arrangement, and wherein the second electrode and the other one of the first and second alternating terminals are arranged at a second corner of the four corners of the rhombus arrangement.

* * * * *